Figure 1:
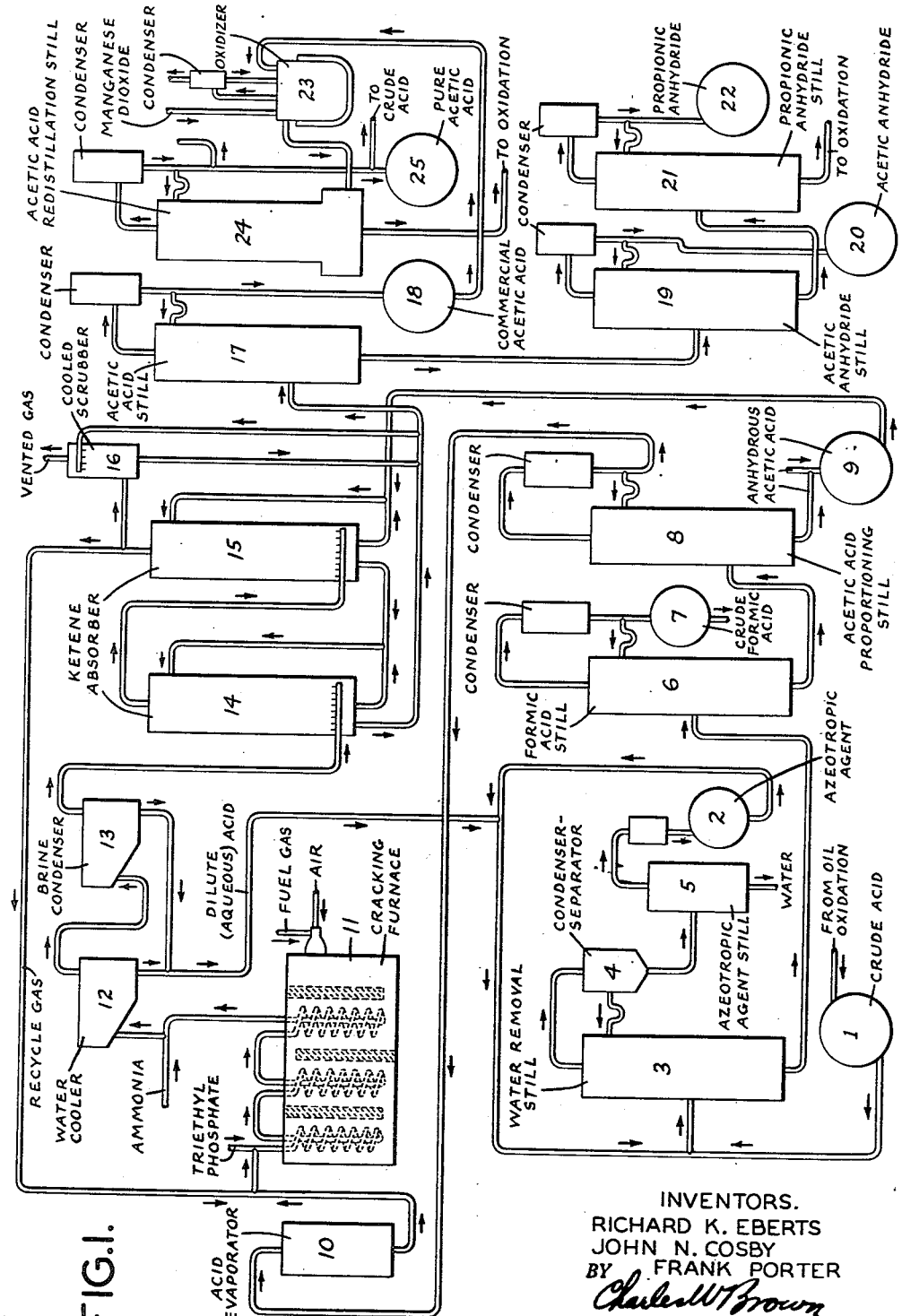

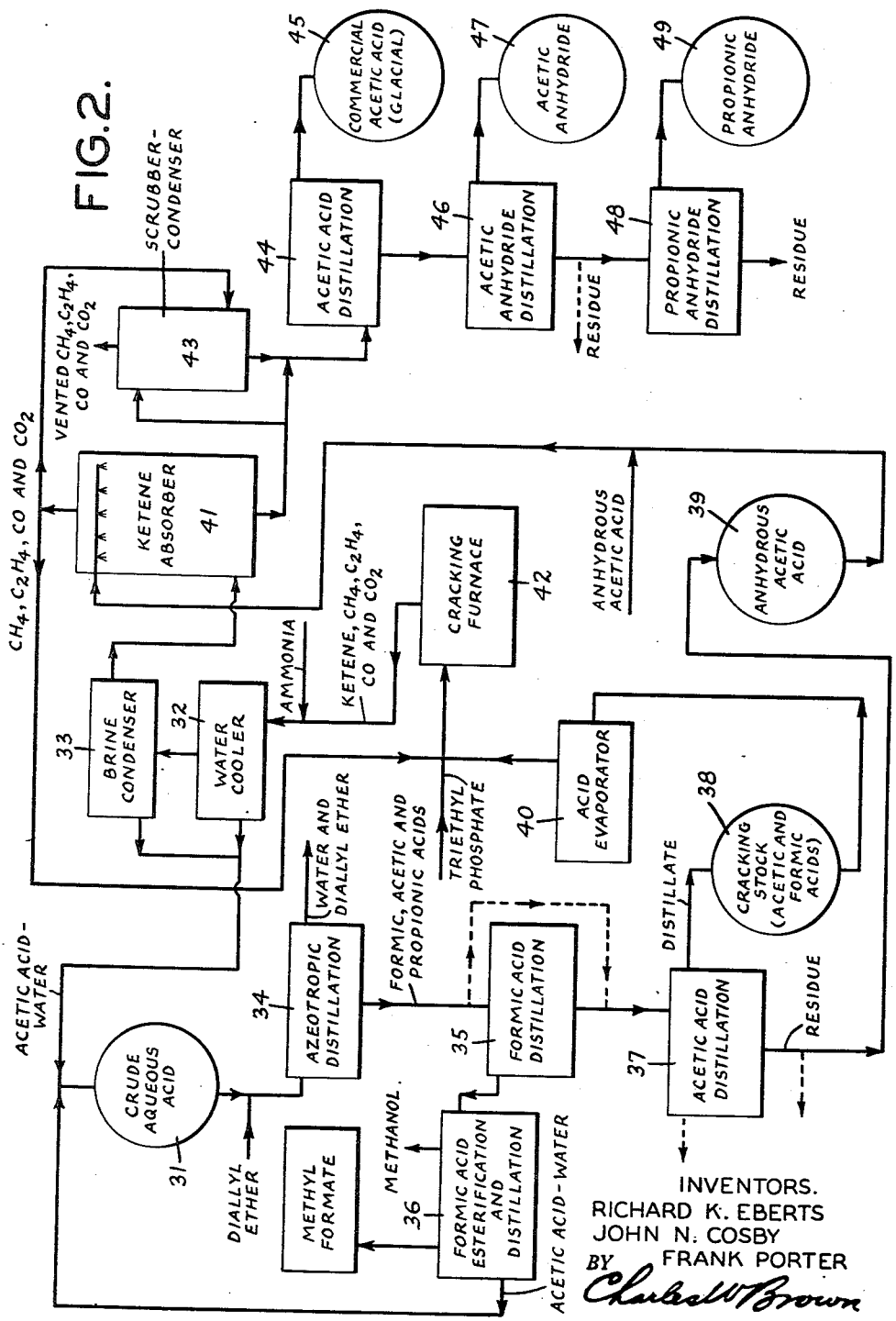

Patented Sept. 7, 1954

2,688,635

UNITED STATES PATENT OFFICE

2,688,635

PROCESS FOR THE PRODUCTION OF KETENE OR ACETIC ANHYDRIDE FROM A MIXTURE OF ACETIC ACID AND FORMIC ACID

Richard K. Eberts, Mendham, and John N. Cosby and Frank Porter, Morris Township, Morris County, N. J., assignors to Allied Chemical & Dye Corporation, New York, N. Y., a corporation of New York Application May 24, 1951, Serial No. 228,004

12 Claims. (Cl. 260—547)

This invention is directed to a process for treating a crude aqueous acetic acid solution containing formic acid to recover the acetic acid in the form of its anhydride. The invention further is directed to a process for treating such a crude aqueous acetic acid which additionally contains propionic acid to recover from such an acid the acetic acid as acetic anhydride and the propionic acid as such, or to recover both the acetic and propionic acids as their anhydrides.

Aqueous acetic acid solutions containing substantial amounts of formic acid with or without propionic acid are produced as products of various processes. For example, by the liquid phase oxidation of hydrocarbon oils an aqueous reaction product may be produced from which, by fractional distillation, crude aqueous acetic acid solutions containing formic acid and, depending upon the distillation conditions, also containing propionic acid are recoverable. Crude aqueous acetic acid solutions recovered from the pyroligneous acid product of wood distillation usually contain formic acid and frequently small amounts of propionic acid.

The separation of formic and acetic acids is difficult, particularly from an aqueous mixture of the acids, since in the presence of water the formic and acetic acids tend to distill at similar distillation temperatures. In most of the processes heretofore employed for the recovery of acetic acid from crude acids of the above-described types, formic acid and, when present, propionic acid usually appears in the purified acetic acid product. It has been customary to heat the purified acetic acid with an oxidation agent, e. g. potassium permanganate to destroy the so-called empyreumatic materials present, including formic acid, to obtain a high purity acetic acid product.

We have now discovered a new procedure for treating the crude aqueous acetic acid solutions containing formic acid or both formic and propionic acids, and frequently also containing some compounds higher boiling than propionic acid, whereby the acetic acid may be effectively and economically recovered in the form of its anhydride. Our process is also adaptable to, and in preferred embodiments provides for, the recovery of the major portion of the formic acid present in the crude acid as free formic acid or as methyl or ethyl formate and of propionic acid present in the form of its anhydride.

It is known that acetic acid may be cracked to ketene by heating at elevated temperatures, usually in the presence of a catalyst, and that this ketene may be absorbed in and reacted with substantially anhydrous acetic acid to form acetic anhydride. In order to obtain high conversions and efficiencies in cracking the acetic acid to ketene, it is known to carry out the cracking step under greatly reduced pressures below atmospheric. While it has been proposed to dilute the acetic acid vapors with inert gases, this has not given the improvement obtainable by operating under low pressures.

We have discovered that acetic acid accompanied by formic acid and water, when subjected to the conditions known for cracking pure acetic acid to ketene, is also cracked without these impurities largely decreasing the efficiency with which the acetic acid is converted to ketene. Furthermore, we have discovered that when vapors of this impure acetic acid are suitably diluted with inert gas, including the gaseous reaction products formed by cracking the impure acetic acid to ketene (these gaseous materials being left after condensing from the reaction product water and acetic acid and absorbing the ketene, and consisting almost entirely of methane, ethylene and oxides of carbon), the acetic acid may be cracked at atmospheric pressures with substantially the same high attacks on the acetic acid supplied to the ketene cracking step and high yields of ketene based on the acetic acid which is attacked as may be obtained by employing reduced pressures far below atmospheric. Under the conditions at which acetic acid is cracked to ketene, formic acid present is practically completely decomposed. The decomposition products appear to be carbon monoxide and water (there being some evidence, however, that the decomposition products may also include carbon dioxide and hydrogen). Other than the water, the decomposition products are normally gaseous materials and the ketene and acetic acid in the gases leaving the ketene cracking step are readily separable therefrom. Not only these gaseous decomposition products of the formic acid, but the vapors of formic acid itself serve as an effective diluent in the cracking of the acetic acid to ketene. We have further discovered that when ketene is absorbed in a mixture of acetic and propionic acids containing a major proportion of acetic acid and a minor proportion of propionic acid, by fractional distillation of the resulting reaction product of the ketene with the acids, acetic anhydride and propionic anyhydride may be separately recovered in commercially pure condition.

In employing our process for the recovery of acetic acid from a crude aqueous acid containing it together with formic acid, in step 1 the aqueous acid is distilled to carry the water over as distillate. A portion of the formic acid accompanies this water into the distillate. Depending upon the degree of rectifying the vapors in this distillation, a greater or lesser proportion of the formic acid may be carried over with the water without taking over a major proportion of the acetic acid. Accordingly, our process may be operated to take off as free formic acid a greater or lesser proportion of that present in the crude acid, as may be desired. To recover the acetic acid in the residue of this distillation free from formic acid is, however, very costly. It is, therefore, a major advantage of our process that it provides an efficient method for producing acetic acid and/or acetic anhydride free from formic acid from the crude acid without having to employ highly effective, costly distillations to remove the formic acid present in the crude acid.

The acetic acid residue of this first distillation contains a portion of the formic acid and any propionic acid present in the crude acid. This residue is then further distilled in step 2 of our process to distill over a portion of the acetic acid present accompanied by the formic acid and any water not removed in the first distillation. The total distillate product of this step contains about 1-5 parts by weight or more formic acid to 20 parts by weight acetic acid. There is left as undistilled residue of this step the remainder of the acetic acid essentially free of formic acid and water, but accompanied by propionic acid, when this also is present in the initial crude acid. The acetic acid contaminated with formic acid obtained in this step 2 is subjected in step 3 to cracking of the acetic acid to ketene. The substantially anhydrous acetic acid in the residue of step 2, with or without the propionic acid present in that residue, is used to absorb and react with the ketene formed by cracking acetic acid to produce acetic anhydride or both acetic and propionic anhydrides. Or this anhydrous acetic acid residue may be distilled to recover separately the acetic and propionic acids as anhydrous, commercial products and an anhydrous acetic acid from another source used for absorption of the ketene to form acetic anhydride.

The initial distillation of the crude aqueous acid in step 1 may take place in one or in several stages with separate recovery of distillates from each stage. When the crude aqueous acid contains more than 5% water, it is preferred first to distill it in the presence of an azeotropic agent which serves to facilitate separation of the water from acetic acid or from a mixture of formic and acetic acids and removal of the water in the distillate product. Numerous azeotropic agents are known to act in this manner. We prefer to employ the aliphatic ethers having boiling points in the range 85° to 95° C. and in particular diallyl ether. Formic and acetic acids in the crude acid are left in the residue of this distillation substantially freed of water.

When the ratio of formic acid to acetic acid in the crude aqueous acid is greater than about 1:20, in distilling the residue left after the removal of water, it is preferred first to take off a distillate fraction containing most of the formic acid, leaving a residue of this distillation containing the remaining formic acid, acetic acid, and any higher boiling constituents, e. g. propionic acid, present in the initial crude acid. The formic acid distillate carried off in this step is fractionally dstilled to take overhead the formic acid leaving a residue containing acetic acid. This residue is added to the residue remaining from the formic acid distillation and the combined residues distilled to take off a distillate containing acetic acid accompanied by a residual small amount of formic acid and residual water and leave a residue containing substantially anhydrous acetic acid essentially free of formic acid and water.

When it is desired to recover formic acid as methyl or ethyl formate, the formic acid distillate taken off in step 2 is mixed with methanol or ethanol in amount sufficient for reaction with the formic acid present to esterify it. Preferably, a small excess of alcohol is used, i. e. somewhat more than the stoichiometric ratio of 1 mol of the alcohol for every 1 mol of formic acid. This mixture, with a small amount of added acid such as sulfuric acid or other material which catalyzes the esterification of acids with alcohols, is heated and distilled carrying over the formate ester and any acetate ester formed by reaction of the acid and alcohol leaving an aqueous residue containing the acetic acid carried over in distilling formic acid from the dewatered crude acid. This residue is recycled and mixed with crude aqueous acid subsequently treated by our process for recovery of the acetic acid. Any acetate ester formed in esterifying the formic acid is separately recovered and, preferably, is returned to the reaction mixture in which formic acid is esterified. Acetate ester thus recycled is converted to acetic acid and formate ester, replacing a part of the methanol or ethanol which otherwise would be required for the esterification of the formic acid. In this manner a large portion of the formic acid in the second distillate from the crude aqueous acid may be recovered as methyl or ethyl formate.

The residue of the distillation to remove formic acid is distilled taking off as distillate the remainder of the formic acid and any residual water present together with a portion of the acetic acid. The remainder of the acetic acid and substantially all of the propionic acid and higher boiling materials if present are left in the residue of this third distillation of the crude acid.

When the crude aqueous acid contains no more than about 5% water, it is preferred to employ fractional distillation rather than an azeotropic distillation for removal of water followed by the fractional distillation for the removal of formic acid. When the crude aqueous acid contains no more than 1 part formic acid to about 20 parts acetic acid, after removal of water if the water content of the crude acid is above 5%, it is preferred to distill the crude acid in one step, corresponding to step 2 of the process described above. An acetic acid distillate is taken off containing essentially all the water and formic acid present and a portion of the acetic acid, leaving a substantially anhydrous residue of acetic acid free from formic acid but containing the propionic acid and higher boiling materials initially present in the crude aqueous acid.

The acetic acid distillate obtained in any of the foregoing manners, containing formic acid and any water not removed in a previous distillation of the crude aqueous acid, which is subjected to treatment to crack the acetic acid to form ketene, should contain at least 50% acetic acid and no more than 20% water. Generally it contains at least 4% formic acid. In step 3 of our process this distillate is vaporized, mixed with a catalyst promoting the cracking of acetic acid to ketene, and is heated to temperatures at which this cracking occurs. The cracked gases are mixed with a small amount of ammonia to inhibit reactions which otherwise would lower the yields of ketene and are rapidly cooled to condense the water formed in cracking the acetic acid and the unreacted acetic acid present in the cracked gases, leaving uncondensed the ketene and gaseous reaction products formed in cracking the acetic acid. These gaseous reaction products substantially consist of methane, ethylene and oxides of carbon. The mixture of ketene and gaseous reaction products of the ketene cracking is washed with substantially anhydrous acetic acid or a mixture of acetic and propionic acids to absorb the ketene. The residue left after taking off the distillate which is passed to the ketene cracking step, is preferably used as the anhydrous feed stock for the ketene absorption, with or without addition of anhydrous acetic acid from an outside source. In thus operating the ketene reacts with the acetic acid to form acetic anhydride or with a mixture of acetic and propionic acids to form a product which on fractional distillation yields as separate distillates acetic anhydride and propionic anhydride. On the other hand, this residue may be distilled to take off the acetic acid as distillate, which is used for absorption and reaction with the ketene to form acetic anhydride. The propionic acid thus separated from the acetic acid may then be recovered by distillation as a product of the process.

The procedure for cracking acetic acid to ketene, condensing from the resulting products water and acetic acid, and absorbing the ketene in substantially anhydrous acetic acid (with or without propionic acid also being present) may be carried out under any of the conditions known for carrying out these steps. However, as pointed out above, we have discovered that by recycling a part of the uncondensed and unabsorbed gaseous products of the ketene cracking and mixing them with the impure acetic acid vapors on their way to the cracking step so as to suitably dilute the acetic acid, the cracking may be carried out at atmospheric pressures with high attack on the acetic acid (above 35%, preferably above 50%, per pass), and at the same time high yields of ketene are obtainable based on the acetic acid attacked. Our process avoids the difficulties met with in operating a ketene cracking step under very low pressures below atmospheric. To accomplish these ends, the acetic acid vapors already diluted with formic acid and with small amounts of water vapor, are further diluted with sufficient recycled gaseous reaction products so that the ratio of total diluent to acetic acid is at least 3:1 by volume. The attack on the entering acetic acid is a function of the temperature. By maintaining known suitably high temperatures in the ketene cracker, the desirable high attacks are obtained. Operating the ketene cracking step with this dilution of the acetic acid vapors and maintaining the reaction gas mixture under atmospheric pressures is an important feature of our preferred process, contributing largely to the efficiency and economy of converting the impure crude acetic acid to acetic anhydride. While it is much prefered to dilute the impure acetic acid with recycled gaseous reaction products of the ketene cracking, similar results are obtainable by diluting with other gas which is inert towards acetic acid under the cracking conditions, e. g. with nitrogen gas.

The attacks on the acetic acid in passing through the ketene cracking step referred to herein are calculated on the basis of the difference between the acetic acid entering the ketene cracking step and that recovered by condensing the water and acetic acid from the product gases leaving this step. The yields of ketene are calculated on the basis of the acetic anhydride formed by absorption of the ketene in glacial acetic acid after the water and acetic acid have been condensed from the product gases.

Percent attack =

$$\frac{\text{Entering acetic acid} - \text{recovered acetic acid}}{\text{Entering acetic acid}} \times 100$$

Percent yield =

$$\frac{\text{Ketene equivalent of acetic anhydride}}{\text{Acetic acid attacked}} \times 100$$

All values in these equations are in mols.

The liquid produced in the ketene absorption step is fractionally distilled. In this distillation the acetic acid present is first distilled over and recovered separate from a second distillate of acetic anhydride which distills over at somewhat higher temperatures. When propionic acid is present, following removal of acetic anhydride, a third distillate of propionic anhydride is taken over at more elevated temperatures. The residue of these three distillation steps contains any higher boiling compounds in the absorption liquor fed to the ketene absorber and is withdrawn following recovery of the propionic anhydride. While these distillations may be carried out under atmospheric pressures, we prefer to distill over the acetic anhydride and propionic anhydrides under reduced pressures of the order of 100 mm. Hg.

Our invention will be further illustrated and described by the following examples for treating crude aqueous acid recovered as a product of oxidizing gasoline. The accompanying drawings are flow diagrams showing the procedures of these examples and will be described in connection therewith.

*Example 1.*—With reference to Fig. 1 of the accompanying drawing, a crude aqueous acetic acid having approximately the following composition is supplied to crude acid storage vessel 1 for treatment in accordance with the process of this example to produce acetic and propionic anhydrides:

| | Per cent |
|---|---|
| Water | 36.9 |
| Formic acid | 7.6 |
| Acetic acid | 44.3 |
| Propionic acid | 8.2 |
| Higher and lower boiling constituents | 3.0 |

Such a crude acid may be obtained by oxidizing natural gasoline in the liquid phase. This procedure involves oxidizing a natural gasoline in the liquid phase by treatment with air in the presence of a catalyst. The aqueous phase of the oxidation product is subjected to distillation to remove low boiling compounds distilling over at top of column temperatures up to a temperature in the range 80–90° C. Following removal of these low boiling materials an acid fraction is taken off at top of column temperatures ranging from 80–90° C. up to about 150° C., leaving a residue of higher boiling compounds. This acid fraction is separately recovered as the crude acid supplied to storage vessel 1 of accompanying Fig. 1.

This crude aqueous acid together with aqueous acid from a cooler 12 and condenser 13 and mixed with diallyl ether from azeotropic agent storage vessel 2 is continuously fed to a distillation column or still 3. In this still the aqueous acid is azeotropically distilled to remove water. The diallyl ether serves as an azeotropic agent to carry over the water in the distillate, leaving as residue or distillation bottoms a mixture of formic, acetic and propionic acids containing only a small amount of residual water. By maintaining a top of column temperature of about 78° C. and a temperature of about 100° C. in the bottom of the still, practically all the water is carried overhead with the diallyl ether. The overhead vapors are condensed in condenser-separator 4. The liquid condensate forms two layers, an upper ether layer which is returned as reflux to still 3 and a lower aqueous layer which is passed to distillation column or still 5 for recovery of the diallyl ether carried in solution or dispersion in the aqueous layer. The water from which this azeotropic agent has been recovered is withdrawn from the bottom of still 5 and discarded. This removal of water from the crude acid represents step 1 of our process.

In step 2, the mixture of acids left as residue of the azeotropic distillation is passed to formic acid still 6 in which this material is fractionally distilled. By maintaining a top of column temperature of about 105° C. and a temperature of about 120° C. in the bottom of still 6, about 90% of the formic acid present in the crude acid from storage vessel 1 is taken over as distillate withdrawn to crude formic acid storage vessel 7. This formic acid distillate contains about 1 part by weight of acetic acid for very 2.5 parts by weight of formic acid, and is accompanied by a small, residual amount of water. It is redistilled by a conventional distillation procedure not shown in the drawing. The distillate first taken over containing diallyl ether is returned to storage vessel 2. This is followed by a distillate rich in formic acid, which is withdrawn and may be treated, as desired, to recover the formic acid therefrom either as the free acid or one of its compounds. The residue containing acetic acid accompanied by residual formic acid is returned to still 6. The residue or bottoms from formic acid still 6 is passed into acetic acid proportioning still 8.

Still 8 is operated with a top of column temperature of about 115° C. and at about 130° C. in the bottom. In this distillation a portion of the acetic acid accompanied by the formic acid and any residual water in the residue from still 6 is carried over as distillate and passed to acid evaporator 10 where it is vaporized and serves as feed stock for the ketene cracking step of our process. From the bottom of still 8 a substantially anhydrous residue of acetic acid accompanied by propionic acid and higher boiling materials is passed to anhydrous acetic acid storage vessel 9. This anhydrous acetic acid with additional anhydrous acetic acid supplied to storage vessel 9 serves as the absorption liquid for the ketene produced from the distillate taken off from still 8. Under the distillation conditions of this example, of the acetic acid content in the residue from still 6 about 87 mol percent is taken overhead from still 8 in the feed to the ketene cracking step and the remaining 13 mol percent is taken from the bottom of still 8 for use in absorbing the ketene. In addition, for every 3 lbs. of this anhydrous acetic acid recovered from the crude acid supplied to our process from storage vessel 1, about 8 lbs. anhydrous acetic acid is supplied to vessel 9 from an outside source. Since a large market for the acetic anhydride obtained by our process is for use in producing cellulose acetate and in so doing the acetic anhydride is converted to acetic acid, the anhydrous acetic acid recoverable from the cellulose acetate plant is a particularly desirable source of supplemental acid for the ketene absorption step of our process.

As representative of the results obtained by operating steps 1 and 2 of our process in accordance with this example materials of the following composition are obtained:

Residue from step 1 (still 3):

| | Per cent |
|---|---|
| Acetic acid | 78.3 |
| Propionic acid | 8.4 |
| Formic acid | 7.8 |
| Higher boiling compounds | 3.1 |
| Water | 2.5 |

Feed to acid-proportioning still 8 (residue from formic acid still 6):

| | Per cent |
|---|---|
| Acetic acid | 84.1 |
| Propionic acid | 9.0 |
| Formic acid | 0.9 |
| Higher boiling compounds | 3.3 |
| Water | 2.7 |

Distillate product of step 2 (taken to acid evaporator 10):

| | Per cent |
|---|---|
| Acetic acid | 95.4 |
| Formic acid | 1.1 |
| Water | 3.5 |

Residue from bottom of acetic acid proportioning still (passed to storage vessel 9):

| | Per cent |
|---|---|
| Acetic acid | 47.1 |
| Propionic acid | 38.7 |
| Higher boiling compounds | 14.1 |

The acid vapors from evaporator 10 are mixed with triethyl phosphate and with recycled unabsorbed gaseous reaction products from a ketene absorber 15 to further dilute the acetic acid vapors before they are passed into a cracking furnace 11. The triethyl phosphate is introduced as a liquid into the vapors and gases passing to cracking furnace 11 at a point at which the liquid flows along with these gases into the furnace and is vaporized, and the vapors mix with the heated gases. In thus operating, supplying from vaporizer 10 vapors obtained by vaporizing 58 lbs. per minute of the acetic acid feed stock, one-tenth pound per minute of triethyl phosphate is introduced into these vapors and they are mixed with about 1300 cubic feet of recycled gas from ketene absorber 15 (volume calculated to atmospheric pressure and 25° C.). This recycled gas will carry with it about 8 lbs. of acetic acid entrained with the gas as it leaves the ketene absorber. Under these conditions, with the reaction mixture passing into ketene cracking furnace 11 containing 55.3 lbs. per minute acetic acid and 0.6 lb. per minute formic acid, the dilution ratio of total diluent (recycled gas, water and formic acid) to acetic acid vapors (calculated for atmospheric pressure and 25° C.) is 3.7:1.

In cracking furnace 11 the reaction mixture passes in series through three coils externally heated by hot combustion products passed about the three coils in a sequence which is the reverse of that in which the reaction mixture passes in turn through the several coils. The combustion products heating the last coil through which the reaction mixture passes are at a temperature of about 950° C. They contact the first coil through which the reaction gases pass at a temperature of about 800° C. The total length of these three coils and their internal diameters are such that at the above rates of flow of acetic acid and diluent the space velocity of the acetic acid (volume of acetic acid vapors, calculated for one atmospheric pressure and 25° C., per unit volume of the free space in the cracking coils per hour) is in the range of about 900 to about 1100.

Ammonia, about one-tenth pound per minute, is introduced into the product gas leaving the cracking furnace to inhibit the progress of reactions which would lower the yields of ketene. The gases are then quickly cooled first by passing through a cooler 12 in heat exchange with cooling water and then through a condenser 13 in heat exchange with refrigerated brine at −10° C. Acetic acid and water are thus condensed from the gases and are withdrawn and passed to crude acid storage 1 or, as shown in the drawing, directly to water removal still 3.

The uncondensed gases pass into ketene absorber 14. This is a packed tower in which the gases are intimately contacted with a countercurrent flow of absorption liquid containing substantially anhydrous acetic and propionic acids. From the top of absorber 14 the unabsorbed gases pass into the bottom of absorber 15 and pass upwardly therethrough in contact with the anhydrous acid from storage vessel 9 containing acetic and propionic acids. As shown in the drawing, the absorption liquid is recirculated through each absorber, and liquid from absorber 15 is advanced to absorber 14 for use as the absorption liquid for this tower. The product formed by absorption and reaction of the ketene is drawn from the bottom of absorber 14.

By washing the gases with substantially anhydrous acetic and propionic acids in absorbers 14 and 15, the ketene in the gases is absorbed by these acids and reacts therewith. Heat evolved by this absorption and reaction is removed by means of cooling coils placed in the mid-portion of each absorber. The gaseous by-products of the cracking (methane, ethylene and oxides of carbon) pass out of the top of absorber 15 and are in part recycled to cracking furnace 11 for dilution of the acetic acid vapors and in part, sufficient to prevent their accumulation in the system, are vented after being washed in a cooled scrubbing tower 16 with a part of the solution drawn from the bottom of ketene absorber 14. This solution is cooled by a refrigerated brine cooling coil in tower 16, not shown in the drawing.

The liquid drawn from ketene absorber 14 is passed to a distillation still 17. It has substantially the following composition:

| | Per cent |
|---|---|
| Acetic acid | 29.9 |
| Acetic anhydride equivalent | 54.3 |
| Propionic anhydride equivalent | 11.2 |
| High boiling constituents | 4.6 |

This mixture is distilled in acetic acid still 17, taking off as distillate and passing to storage 18 the material distilling over at a top of column temperature of about 118° C. It is a commercial grade glacial acetic acid. The residue is passed from the bottom of still 17 into acetic anhydride still 19 in which it is distilled under a reduced pressure of about 100 mm. Hg. The material distilling over at a top of column temperature of about 84° C. is withdrawn to storage 20. It is a commercial grade acetic anhydride. The residue from the bottom of still 19 is passed to propionic anhydride still 21 in which it is distilled under a reduced pressure of about 100 mm., carrying over as distillate the material distilling at a top of column temperature of about 100° C. This distillate is withdrawn to storage 22 and is a commercial grade propionic anhydride product. The residue left from this final distillation in still 21 is withdrawn from the process. It is most suitably mixed with a hydrocarbon oil which is oxidized to produce the crude acid treated in accordance with the process of this example.

In order to produce a pure acetic acid from the commercial acid in storage 18, this acid is passed into oxidizer 23 where it is heated with manganese dioxide. Oxidizer 23 is a closed kettle provided with a heating jacket, a vapor escape line leading to a condenser and a condensate return line from the condenser to the kettle. About 2–3% of manganese dioxide by weight of the acid charged to the oxidizer is mixed with the acid and the mixture heated to boil it. This treatment with manganese dioxide oxidizes impurities present, including any propionic acid. Gaseous oxidation products such as carbon dioxide escape from the condenser in which the acid vapors are condensed for return to the oxidizer. After about 6–8 hours of thus heating the acid with the manganese dioxide, the unreacted manganese dioxide is allowed to settle out, and the acid is drawn off to the boiler of actic acid distillation still 24.

The acid is distilled, first taking off a cut containing the water formed by the oxidation of impurities present in the acid from vessel 18. This water is accompanied by acetic acid and is preferably returned to crude acid storage 1 for separation of the water and recovery of the acetic acid in water removal still 3. Following removal of the water there is then taken over from still 24 a distillate which is drawn off to storage vessel 25. This distillate is a pure acetic acid product of our process. When material other than acetic acid appears in the distillate being withdrawn to vessel 25 in amounts which would reduce the purity of the acetic acid product below the required standard for purified glacial acetic acid, the distillation is discontinued and the residue is withdrawn. This residue is added to hydrocarbons subjected to liquid phase oxidation to produce the crude acid treated by our process.

*Example 2.*—The procedure of this example is diagrammatically illustrated in Fig. 2 of the accompanying drawings. This example illustrates various modifications of our process for treating the crude aqueous acid to obtain cracking stock and ketene absorption liquor for use in cracking acetic acid to ketene and producing acetic anhydride. The method of treating the cracking stock to form ketene and absorbing the ketene in anhydrous acetic acid of this example is essentially the same as the procedure described in detail in Example 1, except for the use of a single ketene absorption tower instead of the two towers used in carrying out Example 1.

With reference to Fig. 2 of the accompanying drawings, a crude aqueous acid in storage vessel 31 has substantially the following composition:

| | Per cent |
|---|---|
| Water | 32 |
| Formic acid | 8.3 |
| Acetic acid | 48.5 |
| Propionic acid | 8.3 |
| Higher and lower boiling constituents | 3.0 |

This crude aqueous acid together with aqueous acid from a water cooler 32 and brine condenser 33 is azeotropically distilled with diallyl ether as azeotropic agent in a distillation step 34. The water is carried over as distillate by the diallyl ether, leaving as residue or distillation bottoms a mixture of formic, acetic and propionic acids containing only a residual small amount of water. This residue is passed to formic acid distillation 35, where it is fractionally distilled in a batch still. A mixture of formic and acetic acids is distilled over at top of column temperatures up to about 105° C. This distillate contains about 1 part by weight of acetic acid for every 2½ parts by weight of formic acid.

The distillate from distillation 35 is passed to formic acid esterification and distillation 36. Here it is mixed with methanol in amount slightly greater than 1 mol methanol for every 1 mol formic acid present in the mixture, e. g. about 10% excess methanol over the 1:1 mol ratio of methanol to formic acid required for conversion of the acid to methyl formate. About 0.5% sulfuric acid to catalyze esterification of the formic acid is added and the mixture of acids and methanol is heated and fractionally distilled. Methyl formate is distilled over and recovered as a by-product. The residue, after being freed from methyl acetate by distillation, is further distilled to take off a separate distillate of acetic acid and water. This distillate is recycled to crude aqueous acid storage 31 for removal of the water in the azeotropic distillation 34 and recovery of the acetic acid in the residue from distillation 35. The methyl acetate distillate and the residue left after removing the acetic acid and water are recycled to the formic acid esterification reaction mixture.

The residue of distillation 35 has the following composition:

| | Per cent |
|---|---|
| Acetic acid | 82.0 |
| Propionic acid | 12.5 |
| Formic acid | 3.1 |
| Higher boiling compounds | 2.4 |

This acid mixture is fractionally distilled in batch distillation step 37, first taking off at top of column temperatures up to 115° C. a distillate containing a portion of the acetic acid accompanied by the formic acid and residual water, which is passed to cracking stock storage 38. This cracking stock is substantially 4.6% formic acid and 95% acetic acid, the water amounting to only a small fraction of one percent. The residue of this distillation is withdrawn to anhydrous acetic acid storage 39. With 5140 lbs. of residue from 35 being distilled in 37, about 3490 lbs. are distilled over and withdrawn to storage 38 as a mixture containing about 3330 lbs. acetic acid and 160 lbs. formic acid. The residue withdrawn to storage 39, amounting to about 1650 lbs., contains:

About 880 lbs. acetic acid
About 645 lbs. propionic acid
About 125 lbs. higher boiling compounds Acid solution from storage 38 is fed to evaporator 40 in which the liquid is vaporized. The vapors from evaporator 40 are mixed with triethyl phosphate and with recycled unabsorbed gaseous reaction products from a ketene absorber 41 to further dilute the acetic acid vapors before they are passed into a cracking furnace 42. Supplying from evaporator 40 vapors obtained by vaporizing 58 lbs. per minute of the acetic and formic acids, one pound per minute of triethyl phosphate is introduced into these vapors and they are mixed with about 1300 cubic feet of recycled gas from ketene absorber 41 (volume calculated to atmospheric pressure and 25° C.). This recycled gas will carry with it about 8 lbs. of acetic acid entrained with the gas as it leaves the ketene absorber. Under these conditions, with the reaction mixture passing into ketene cracking furnace 42 containing 63.5 lbs. per minute acetic acid and 2.7 lbs. per minute formic acid, the dilution ratio of total diluent (recycled gas and formic acid) to acetic acid vapors (calculated for atmospheric pressure and 25° C.) is 3:1.

Cracking furnace 42 operates in the same manner as the cracking furnace of Example 1 above to crack the acetic acid to ketene and decompose the formic acid in the feed to this cracking furnace.

About one pound per minute of ammonia is introduced into the product gas leaving the cracking furnace to inhibit the progress of reactions which would lower the yields of ketene. The gases are then quickly cooled first by passing through cooler 32 in heat exchange with cooling water and then through condenser 33 in heat exchange with refrigerated brine at −10° C. Acetic acid and water thus condensed from the gases are withdrawn and passed to crude acid storage 31.

The uncondensed gases pass into ketene absorber 41 in which they are intimately contacted in the upper part of the tower with a countercurrent flow of absorption liquid containing substantially anhydrous acetic and propionic acids. This absorption liquid is made up of absorption stock from storage vessel 39 with added glacial acetic acid from an outside source, with or without also adding to this absorption liquid the glacial acetic acid obtained as one of the products of this example as hereinafter described. This additional glacial acetic acid may be obtained from a crude acid like that supplied to storage 31; e. g., a glacial acetic acid recovered from gasoline oxidation product by a process described in U. S. application Serial No. 155,224, filed by us April 11, 1950. In the process of this example, with 3490 lbs. of acid from storage 38 being subjected to cracking to ketene in furnace 42, and 1650 lbs. of acid absorption stock from storage 39 being passed to absorber 41, we supply with this absorption stock an additional 1210 lbs. of glacial acetic acid, some of which may be acid recovered from the liquid leaving the ketene absorber 41.

By washing the gases with substantially anhydrous acetic and propionic acids in absorber 41, the ketene in the gases is absorbed by these acids and reacts therewith to form acid anhydrides which, on distillation, yield acetic and propionic acid anhydrides as separate products. The gaseous by-products of the ketene cracking pass out of the top of the ketene absorber 41 and are in part recycled to cracking furnace 42 for dilution of the acetic acid vapors. The remainder is vented after being washed in a tower 43 with solution drawn from the bottom of ketene absorber 41.

The liquid drawn from ketene absorber 41 is passed to batch distillation 44. It has substantially the following composition:

| | Per cent |
|---|---|
| Acetic acid | 19 |
| Acetic anhydride equivalent | 71 |
| Propionic anhydride equivalent | 8.2 |
| High boiling constituents | 1.8 |

This mixture is distilled, taking off as distillate and passing to storage 45 the material distilling over at top of column temperatures up to about 118° C. It is a commercial grade glacial acetic acid. The residue is subjected to vacuum distillation 46 in which it is distilled under a reduced pressure of about 100 mm. Hg. The distillate going over at top of column temperatures of about 84° C. is withdrawn to storage 47. It is a commercial grade acetic anhydride. The residue is then further distilled under a reduced pressure of about 100 mm., in distillation 48. The material distilling at top of column temperatures of about 100° C. is withdrawn to storage 49. It is a commercial grade propionic anhydride product. The intermediate distillate fraction may be recycled and added to the feed to distillation 44. The residue left from this final distillation is withdrawn from the process.

*Example 3.*—An aqueous reaction product from oxidation of gasoline in liquid phase is fractionally distilled and the fraction distilling at top of column temperatures of 105° to 141° C. is separately recovered. This crude aqueous acid has substantially the following composition:

| | Per cent |
|---|---|
| Water | 36.9 |
| Formic acid | 7.6 |
| Acetic acid | 44.3 |
| Propionic acid | 8.2 |
| Higher and lower boiling materials | 3.0 |

This crude acid is subjected in distillation 34 of the process illustrated in Fig. 2 of the accompanying drawing to azeotropic distillation in the presence of diallyl ether to remove water, leaving a residue of substantially the following composition:

| | Per cent |
|---|---|
| Water | 3.8 |
| Formic acid | 10.6 |
| Acetic acid | 68.5 |
| Propionic acid | 12.8 |
| Higher boiling materials | 4.2 |

This residue is passed directly from distillation 34 to distillation 37. Here it is distilled to take off the fraction distilling over at top of column temperatures up to 118° C., which is passed to cracking stock storage 38. The residue of this distillation is withdrawn from the process. The fraction passed to storage 38 contains the following materials:

| | Per cent |
|---|---|
| Water | 6.4 |
| Formic acid | 18.6 |
| Acetic acid | 71.2 |
| Propionic acid | 2.4 |

This acid cracking stock is vaporized and, together with 0.2% triethyl phosphate and diluted with recycled gases from ketene absorber 41, is passed through a single coil in a ketene cracking furnace 42 heated to 825° C. (temperature of the gases surrounding the cracking coil) at a space velocity of the acetic acid of 890, and a ratio of total diluent to acetic acid of 5.6:1. The gases leaving the cracking furnace are mixed with a small amount of ammonia and promptly and quickly cooled in cooler 32 and condenser 33 to condense out acetic acid and water. The uncondensed gaseous products are passed in contact with glacial acetic acid from an outside source in ketene absorber 41 to absorb the ketene, forming a solution of acetic anhydride in anhydrous acetic acid. The unabsorbed reaction product gases are recycled in amount sufficient to provide the above ratio of total diluents for the acetic acid passing to the ketene cracker. The excess of unabsorbed gases is bled from the process.

By fractional distillation 44 of the ketene absorption product the acetic acid is first distilled over and recovered as a commercial glacial acetic acid. Following this, distillation of the residue in distillation 46 yields a marketable acetic anhydride product. The residue of distillation 46 is withdrawn from the process. Glacial acetic acid obtained from the first of these distillation steps may be recycled to serve as a part of the glacial acetic acid absorption liquid used for scrubbing the ketene containing gases in the ketene absorber.

In operating in accordance with the procedure described in this example, we obtained a 53% attack on the acetic acid in the cracking stock per pass through the ketene cracking furnace and condensers in which the water was removed from the cracked product gases, and a 68% yield of acetic anhydride based on the acetic acid attacked.

In operating the process of this example, modified to pass the acetic acid through the ketene cracker at a space velocity of 1110 and diluted in a ratio of 4.6 volumes of total diluent to 1 volume of acetic acid, a 65% yield of ketene was obtained with a 55% attack per pass of the acetic acid entering the ketene cracking furnace.

In operating in accordance with the process of this example, after the 105° to 118° C. cut has been distilled from the crude acetic acid, this acid may be further distilled to take off a cut distilling over at top of column temperatures of 118° to 145° C. which may be redistilled to recover therefrom first its acetic acid content and then a fraction of commercially pure propionic acid. The acetic acid fraction thus obtained may be added to the cracking stock in storage 38. Or the 118° to 145° C. cut may be passed to absorption stock storage 39 and employed to absorb ketene in absorber 41. In this case, the propionic acid in the 118° to 145° C. cut is converted to propionic anhydride and the latter recovered from the residue of distillation step 46 as described in Example 1.

The procedure of this example may also be modified by reversing the order of the azeotropic distillation 34 and distillation 37. Thus, the crude acid may be subjected to fractional distillation and the cut distilling at 105° to 118° C. taken off and subjected to the azeotropic distillation 34 to remove water therefrom. The dewatered fraction is then passed to storage 38 for use as the feed to the ketene cracker 42.

We claim:

1. The process for the production of acetic anhydride from a crude aqueous acetic acid containing formic acid which comprises distilling said crude aqueous acid to remove as distillate essentially all the water and a portion of the formic acid present in said crude acid and, as a distillate separate from the first mentioned distillate, a portion of the acetic acid accompanied by formic acid in a ratio (by weight) of not substantially less than one part formic acid to 20 parts acetic acid, heating vapors of said last mentioned distillate containing acetic acid and formic acid under conditions cracking the acetic acid to ketene, whereby the formic acid present in said vapors is substantially completely decomposed, absorbing in substantially anhydrous acetic acid the resulting ketene, and distilling acetic anhydride from the resulting absorption product.

2. The process of claim 1 wherein the vapors of acetic and formic acids which are heated to crack the acetic acid to ketene are diluted with an inert gas and the diluted vapors are heated to crack the acetic acid under substantially atmospheric pressure.

3. The process for the production of acetic anhydride from a crude aqueous acetic acid containing formic acid which comprises: (1) distilling said crude aqueous acid to remove most of the water and a portion only of the formic acid present therein; (2) distilling the residue of step 1, in this distillation recovering an acetic acid and formic acid distillate containing at least 50% acetic acid, at least 4% formic acid, and no more than 20% water, and in steps 1 and 2 distilling over substantially all of the water and formic acid present in said crude acid leaving a residue of step 2 containing acetic acid substantially free from water and formic acid; (3) heating vapors of the acetic acid and formic acid distillate of step 2 under conditions cracking the acetic acid to ketene; (4) absorbing in acetic acid substantially free from water ketene formed in step 3; and (5) distilling acetic anhydride from the absorption product of step 4.

4. The process of claim 3 wherein the ketene formed by cracking in step 3 the acetic acid in the vapors of the distillate from step 2 is absorbed in step 4 in a substantially anhydrous acetic acid which contains the residue of step 2.

5. The process of claim 3 wherein product gases from the acetic acid cracking step 3 unabsorbed in step 4 are recycled to step 3 and mixed with the vapors of distillate from step 2 in amount sufficient to provide a ratio of total diluent to acetic acid in said vapors of at least 3:1, and the resulting mixture of vapors and recycled gases is heated in step 3 under substantially atmospheric pressure to crack the acetic acid to ketene.

6. The process for the treatment of a crude aqueous acetic acid containing formic and propionic acids which comprises: (1) distilling said crude acid, taking off as distillate most of the water contained therein leaving a residue containing formic, acetic and propionic acids; (2) distilling the residue of step 1, taking off as distillate a portion of the acetic acid accompanied by not substantially less than one part (by weight) formic acid to 20 parts acetic acid, leaving a substantially anhydrous residue of this distillation containing the remaining portion of the acetic acid and the propionic acid present in said crude aqueous acid and substantially free of formic acid; (3) heating vapors of the acetic acid and formic acid distillate from step 2 under conditions cracking acetic acid in said distillate vapors to ketene; (4) absorbing in the residue of step 2 ketene formed by cracking acetic acid in step 3; and (5) distilling the absorption product of step 4 and in this distillation separately recovering the acetic and propionic anhydrides formed by reaction of the ketene with the acetic and propionic acids present in the residue of step 2.

7. The process of claim 6 wherein product gases from the acetic acid cracking step 3 unabsorbed in step 4 are recycled to step 3 and mixed with the vapors of distillate from step 2 in amount sufficient to provide a ratio of total diluent to acetic acid in said vapors of at least 3:1, and the resulting mixture of vapors and recycled gases is heated in step 3 under substantially atmospheric pressure to crack the acetic acid to ketene.

8. The process for treating vapors of crude acetic acid containing by weight not substantially less than 1 part formic acid to 20 parts acetic acid, which comprises diluting said vapors of crude acetic acid with an inert gas in amount sufficient to provide a ratio of total diluent to acetic acid of at least 3:1 by volume, and subjecting the thus diluted vapors under substantially atmospheric pressure to conditions cracking the acetic acid to ketene, whereby the formic acid present in said vapors is substantially completely decomposed, said inert gas being a gas inert towards the constituents present in said crude acetic acid vapors under the conditions of cracking the acetic acid to ketene.

9. The process of claim 8 in which the vapors of crude acetic acid which are subjected to conditions cracking the acetic acid to ketene contain by weight at least 50% acetic acid, at least 4% formic acid, and no more than 20% water vapor.

10. The process of claim 8 wherein the ketene formed by cracking the acetic vapors is absorbed in substantially anhydrous acetic acid leaving unabsorbed product gases of said cracking step and the mixture of vapors of acetic and formic acids is diluted with said unabsorbed product gases.

11. The process of claim 8 wherein the mixture of vapors of acetic and formic acids contains at least 4% formic acid and is subjected to conditions cracking acetic acid to ketene at temperatures at which at least 35% of the acetic acid is attacked, the resulting ketene is absorbed in substantially anhydrous acetic acid leaving unabsorbed product gases of said cracking, and the mixture of vapors of acetic and formic acids is diluted with said unabsorbed product gases.

12. The process for the treatment of a crude aqueous acetic acid containing formic acid which comprises distilling said crude aqueous acid to remove as distillate essentially all the water and a portion of the formic acid present in said crude acid and, as a distillate separate from the first mentioned distillate, a portion of the acetic acid accompanied by not substantially less than one part (by weight) formic acid to 20 parts acetic acid, heating vapors of said last mentioned distillate containing formic acid under conditions cracking the acetic acid to ketene, whereby a gas containing ketene is obtained and the formic acid present in said vapors is substantially completely decomposed.

References Cited in the file of this patent

UNITED STATES PATENTS

| Number | Name | Date |
|---|---|---|
| 1,210,792 | Gorhan | Jan. 2, 1917 |
| 1,884,625 | Dreyfus | Oct. 25, 1932 |
| 1,884,626 | Dreyfus | Oct. 25, 1932 |
| 1,898,687 | Rice | Feb. 21, 1933 |
| 2,107,527 | Evans et al. | Feb. 8, 1938 |
| 2,202,046 | Dreyfus et al. | May 28, 1940 |
| 2,235,561 | Nadeau et al. | Mar. 18, 1941 |
| 2,249,527 | Hull | July 15, 1941 |
| 2,384,374 | Harrison | Sept. 4, 1945 |
| 2,509,877 | Nicolai et al. | May 30, 1950 |